US008136067B2

(12) United States Patent
Wu

(10) Patent No.: US 8,136,067 B2
(45) Date of Patent: Mar. 13, 2012

(54) METHOD OF DESIGN FOR MANUFACTURING

(75) Inventor: Kuo H. Wu, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 80 days.

(21) Appl. No.: 11/682,378

(22) Filed: Mar. 6, 2007

(65) Prior Publication Data
US 2007/0266346 A1  Nov. 15, 2007

Related U.S. Application Data

(60) Provisional application No. 60/800,526, filed on May 15, 2006, provisional application No. 60/805,846, filed on Jun. 26, 2006.

(51) Int. Cl.
*G06F 17/50* (2006.01)
(52) U.S. Cl. ........................................ 716/110
(58) Field of Classification Search ................ 716/1, 19, 716/100, 110
See application file for complete search history.

(56) References Cited

U.S. PATENT DOCUMENTS

| 5,847,965 | A | 12/1998 | Cheng |
| 6,077,310 | A | 6/2000 | Yamamoto et al. |
| 6,408,219 | B2 | 6/2002 | Lamey, Jr. et al. |
| 6,668,360 | B1 * | 12/2003 | Liu ................. 716/106 |
| 2003/0061241 | A1 * | 3/2003 | McGrath ................. 707/200 |
| 2003/0200513 | A1 * | 10/2003 | Bergman Reuter et al. ...... 716/4 |
| 2004/0221250 | A1 * | 11/2004 | Bergman Reuter et al. ...... 716/4 |
| 2005/0044514 | A1 * | 2/2005 | Wu et al. ................. 716/5 |
| 2005/0132306 | A1 | 6/2005 | Smith et al. |
| 2005/0251771 | A1 * | 11/2005 | Robles ................. 716/5 |
| 2006/0026539 | A1 | 2/2006 | Tetelbaum et al. |
| 2006/0123380 | A1 | 6/2006 | Ikeuchi |
| 2007/0055892 | A1 * | 3/2007 | Pikus ................. 713/189 |
| 2007/0078555 | A1 * | 4/2007 | Dorgelo et al. ............. 700/108 |
| 2007/0201442 | A1 * | 8/2007 | Hekmatpour et al. ........ 370/356 |
| 2007/0234246 | A1 | 10/2007 | Sinha et al. |
| 2007/0266356 | A1 * | 11/2007 | Chang et al. ............. 716/6 |
| 2007/0266362 | A1 * | 11/2007 | Lai et al. ................. 716/19 |
| 2007/0288219 | A1 * | 12/2007 | Zafar et al. ............. 703/14 |
| 2008/0059261 | A1 * | 3/2008 | Madok et al. ............. 705/7 |
| 2009/0031261 | A1 * | 1/2009 | Smith et al. ............. 716/2 |

OTHER PUBLICATIONS

Charles Ouyang et al., An Analyticial Model of Multiple ILD Thickness Variation Induced by Interaction of Layout Pattern and CMP Process, IEEE Transactions on Semiconductor Manufacturing, Aug. 2000, 7pages.
Raghvendra, Srinivas et al., "DFM: Linking Design and Manufacturing," Proceedings of the 18th International Conference on VLSI Design Held Jointly with 4th International Conference on Embedded Systems Design, VLSID, 2005, pp. 705-708.

(Continued)

*Primary Examiner* — Jack Chiang
*Assistant Examiner* — Suchin Parihar
(74) *Attorney, Agent, or Firm* — Haynes and Boone, LLP

(57) ABSTRACT

Disclosed is a system and method for enhancing integrated circuit designs and predicting the manufacturability. Design for manufacturability, or DFM, is an integration of DFM advisories; a DFM data kit presented in a DFM unified format; and DFM utilities utilizing the DFM data kit and the DFM advisories for enhancing integrated circuit (IC) designing.

18 Claims, 8 Drawing Sheets

OTHER PUBLICATIONS

Tsujikawa, Hiroyuki et al., "Power-Supply Noise Reduction with Design for Manufacturability," IEICE Trans Fundamentals, vol. E88-A, No. 12, Dec. 2005, pp. 3421-3428.

Chappell, Jeff, "The Future is the FOUP—Company Business and Marketing," Electronic News, Jul. 17, 2000, 2 pages.

Chen, Kuan-Chou, et al., "Integrated Circuits Industry / Front-Opening Unified Pod Audo-Loading Structure," Knowledge Bridge, No. 22, Apr. 2002, 4 pages.

Ottesen, Craig, "Front Opening Pod (FOUP) Fire Protection: A General Overview", Inteternational Sematech, Nov. 5, 1999, 10 pages.

* cited by examiner

METHOD OF DESIGN FOR MANUFACTURING

CROSS-REFERENCE

This application claims the benefit of U.S. Provisional Application 60/800,526 entitled "Design for Manufacturability," filed May 15, 2006, and U.S. Provisional Application 60/805,486 entitled "New Method of Design for Manufacturability," filed Jun. 26, 2006, herein incorporated by reference in its entirety.

BACKGROUND

Design for manufacturability, or DFM, is an integration of manufacturing data and design procedure for better yield and design efficiency. An interaction and communication between designer and manufacturer is enhanced thereby for more accurate, faster, and more efficient design. In one example, various manufacturing data are formulated, quantified, and integrated to enable collaboration between manufacturer and designer, reduce design time and design cost, and increase manufacturing yield and production performance. DFM can be realized at various design stages with collaboration of design tool vendors. For example, the manufacturer may include a semiconductor foundry. The designer may include an integrated circuit (IC) design house. The design tool vendor may include an electronic design automation (EDA) tool vendor.

However, a semiconductor manufacturer needs to provide multiple qualified processes with different criteria. Manufacturers, EDA tool vendors, intellectual property library vendors, and customers will take duplicate effort without sharing resources and there are no consistent results among customers.

BRIEF DESCRIPTION OF THE DRAWINGS

Aspects of the present disclosure are best understood from the following detailed description when read in association with the accompanying figures. It is noted that, in accordance with the standard practice in the industry, various features in the drawings are not drawn to scale. In fact, the dimensions of illustrated features may be arbitrarily increased or decreased for clarity of discussion.

DETAILED DESCRIPTION

Figure 1:
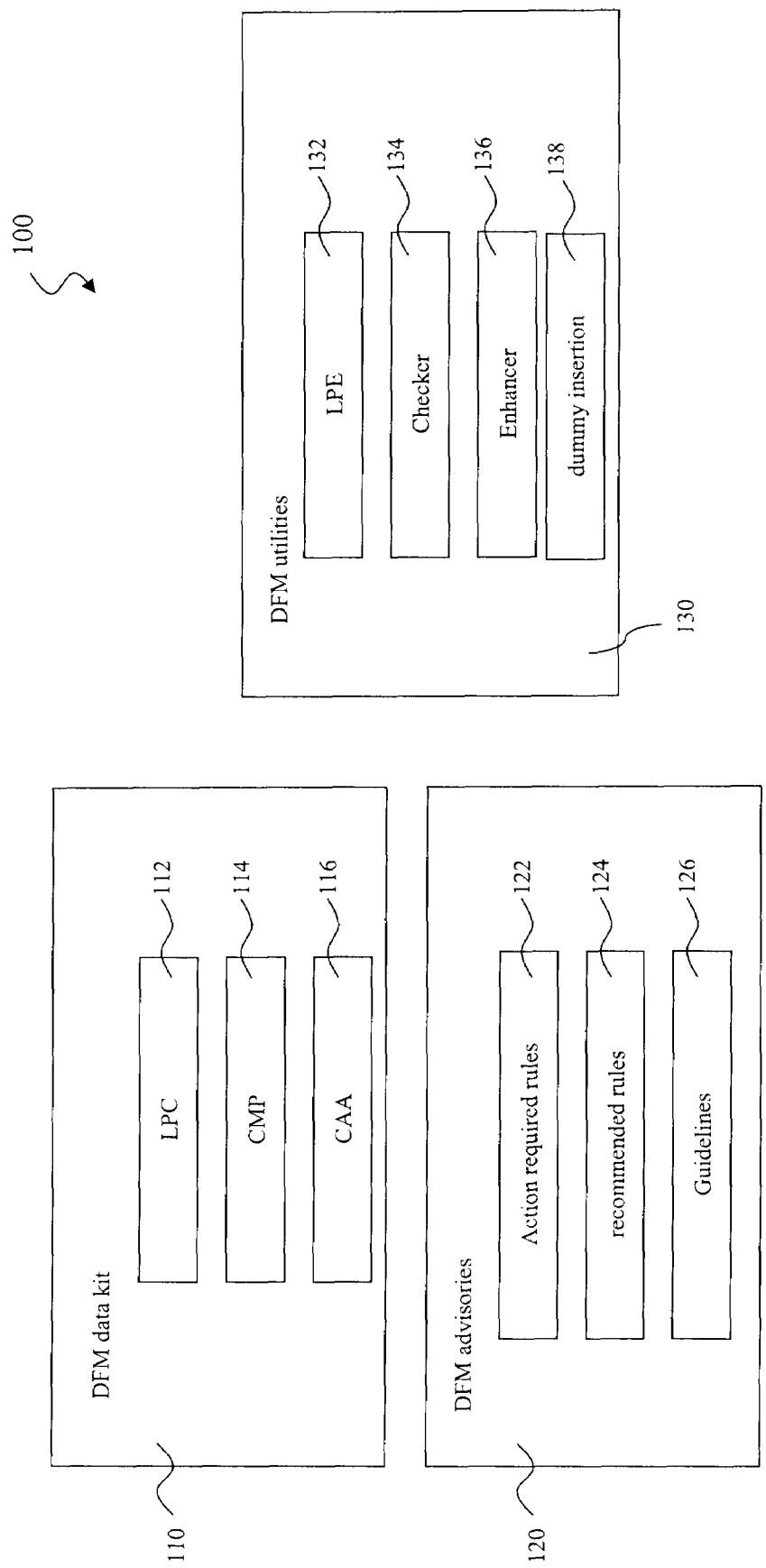
FIG. 1 is a block diagram illustrating one embodiment of a design for manufacturing (DFM) system constructed according to aspects of the present disclosure.

It is understood that the following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. It is understood that the figures provided, certain elements may be provided out of scale for the sake of clarity. Also, specific embodiments, or examples, are provided to better describe the more general inventive concepts.

Design for Manufacturing

Referring to FIG. 1, DFM may include various functional modules to enhance IC design. FIG. 1 illustrates an exemplary DFM (or DFM tool kit) 100. DFM 100 includes a DFM data kit (DDK) 110. Manufacturing data, such as processing recipes, tool characterization, manufacturing environment, production and processing statistical information, and IC testing and measurement data, are compiled, accumulated, and formulated to form the DDK and provide a manufacturing simulation including but not limited to lithography process check (LPC) simulation 112, chemical mechanical polishing (CMP) simulation 114, and/or critical area analysis (CAA) simulation 116.

In LPC simulation 112, a lithography process can be simulated for a design layout by implementing DDK. Various failure areas, defect areas, or weak areas associated with the manufacturing process, referred to as hotspots, can be identified for further design tuning. In the CMP simulation 114, a CMP process is simulated to a design layout by utilizing DDK 110. The design layout is converted to material thicknesses. Thickness hotspots can be identified for further design tweaking and tuning. CAA simulation 116 utilizes DDK for critical area identification (such as patterned lines bridging and pinching) and design improvement. DFM data are packed and presented in a unified format, referred to as DFM unified format (DUF), which will be further described. DDK 110 can be provided to an IC design vendor and be integrated into a design tool, or directly distributed to a designer such as a fab-less design house and employed by the designer in a design tool.

DFM 100 also includes DFM advisories 120. The DFM advisories 120 are extracted from the manufacturing information and provided for an IC design tool and/or a designer. The DFM advisories 120 further include DFM rules that can be incorporated into a design tool for checking any violation.

DFM rules such as action required rules 122 are binding, requiring further actions to eliminate the associated violation. Recommended rules 124 are not binding and suggested for design improvement. The DFM advisories also include guidelines 146, provided for the designer to follow in implementing an IC design procedure.

DFM 100 also includes DFM utilities 130, utilizing DDK 110 and DFM advisories 120 in IC design. DFM utilities 130 may be integrated into a design tool and incorporated into a design flow. For example, dummy insertion may be implemented at the place-and-route design stage so that dummy features are automatically generated in the IC layout to reduce CMP manufacturing variances. DFM utilities 130 may provide corrective actions and solutions to the designer to guide for design improvement and tuning. For example, DFM utilities 130 may provide a solution to eliminate identified hotspots from a lithography process simulation, such as reconfiguring metal lines to eliminate the hotspots. In one embodiment, DFM utilities 130 include a layout parasitic extraction (LPE) deck 132 for extracting more accurate parasitic parameters such as parasitic resistance and capacitance with the manufacturing data such as CMP data, and further for providing suggested actions to adjust parasitic parameters and timing. DFM utilities 130 may also include a checker 134 that is integrated with DFM rules, is able to automatically check the layout for any DFM rule violation, and/or provides suggestions to eliminate the violation. DFM utilities 130 may include an enhancer 136 that is capable of automatically adjusting the layout to meet the DFM rules or eliminate identified hotspots. DFM utilities 130 may further include a dummy insertion module 138 to incorporate dummy insertion into a design layout.

DFM 100 provides model-based utilities from various simulations and rule-based utilities from DFM advisories. DFM 100 can be implemented at various designing stages and certain manufacturing stages. For example, dummy insertion may be implemented at place-and-route step such that the dummy features are included in a layout at early design stage. LPE deck may be implemented at extraction and a timing simulation. LPC may be implemented before the tape-out. Alternatively, LPC may be implemented after the tape-out. In this situation, the layout can be adjusted to eliminate hotspots identified by LPC before fabricating a mask of the layout in a mask shop.

Design Flow Enhancement and Design System

Figure 2:
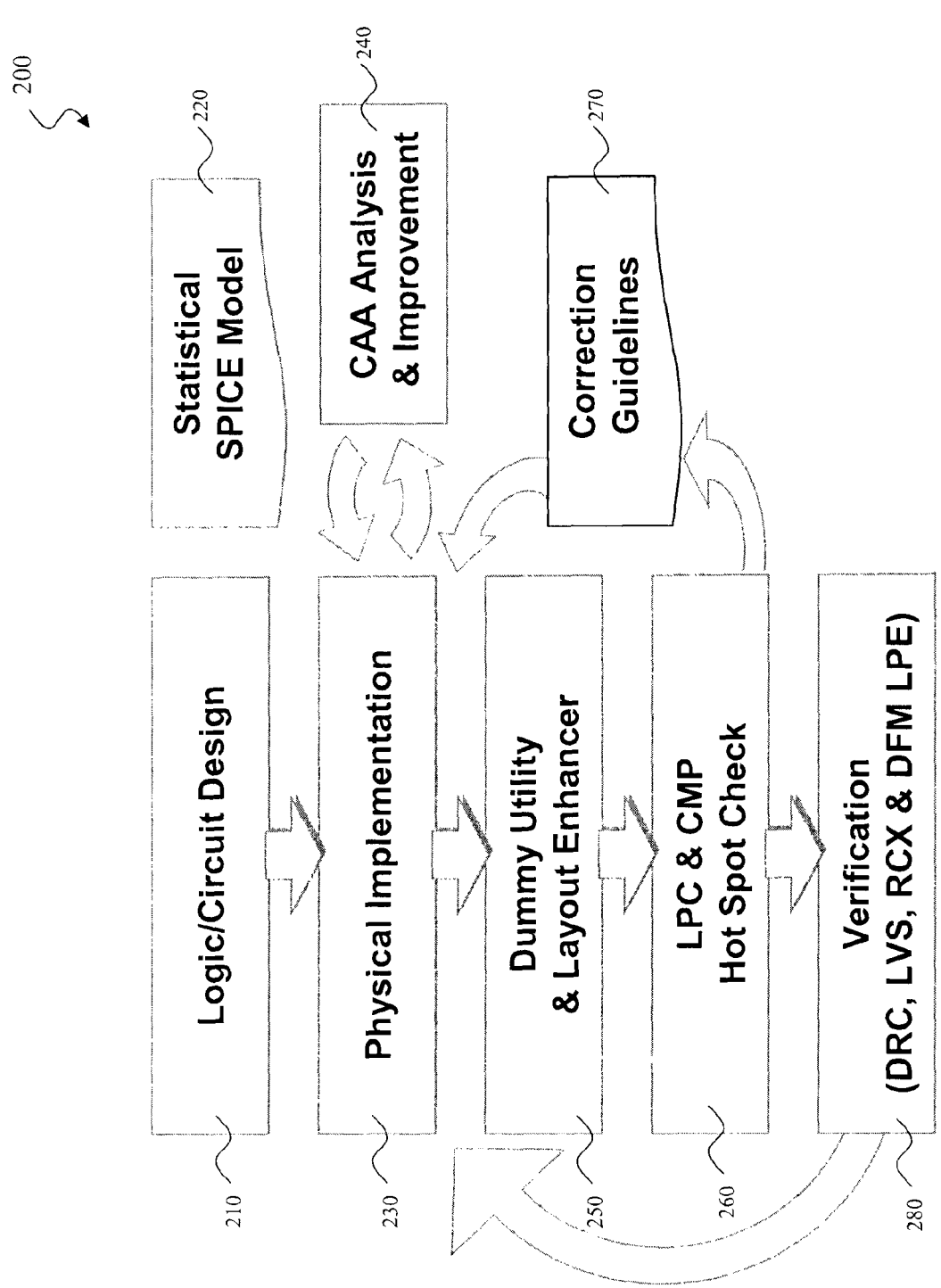
FIG. 2 is a flowchart illustrating a design flow enhanced by DFM constructed according to aspects of the present disclosure.

FIG. 2 is a flowchart 200 illustrating a design flow enhanced by DFM constructed according to aspects of the present disclosure. The design flow 200 may begin at step 210 by logic/circuit designing with input of a statistical design model 220 such as SPICE model. SPICE is circuit-analysis programs developed by UC Berkeley. SPICE provides a complete physical simulation including output signal deformation, signal level, and time delay. Other tools include ASTAP developed by IBM.

The design flow 200 then proceeds to physical design implementation 230 with mutual interaction to CCA analysis and improvement 240. Then the design flow 200 further move to dummy utility and layout enhancer 250 for functionality including dummy insertion and layout tuning. Then the design flow proceeds to LPC and CMP hotspot check 260 utilized by such as DFM utilities 130 of FIG. 1. At this point, proper design correction may be applied accordingly by correction guidelines 270, which may be similar to the guideline 126 of FIG. 1. The steps 250 and 260 may be repeated multiple times until the design is optimized properly. Then the design flow 200 may move to design verification 280 including design rule check (DRC), logic vs. schematic (LVS), resistance and capacitance extraction (RCX), and DFM LPE.

Integrated DFM system and design tool vendor and IPLib partnership

Figure 3:
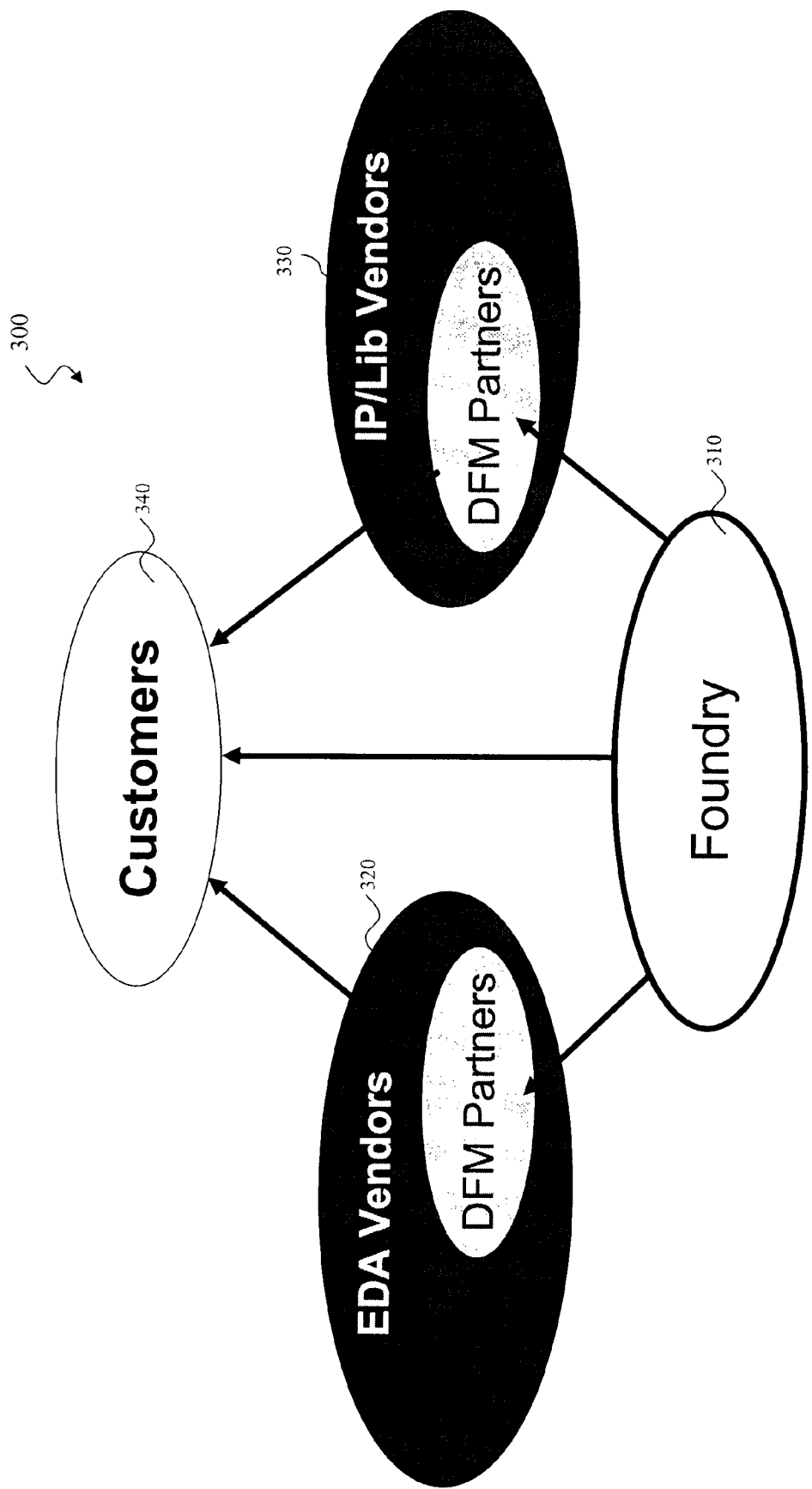
FIG. 3 is a block diagram illustrating a DFM integrated design system with various interactions among design entities constructed according to the aspects of the present disclosure.

FIG. 3 is a block diagram illustrating a DFM integrated design system 300 with various interactions among design entities constructed according to the aspects of the present disclosure. The design system 300 includes a semiconductor manufacturer 310 such as a semiconductor foundry. The semiconductor manufacturer 310 can license DFM modules to IC design vendors 320 such as an EDA vendor such that the DFM module can be built into an EDA design tool for DFM enhanced design functionality. The DFM module may include at least portion of the DFM utilities 130 of FIG. 1 in one example. The DFM module is designed capable of being integrated with DFM data presented in DFM unified format (DUF), and/or may include at least portion of DFM data presented in DUF. Similarly, the semiconductor manufacturer 310 may also license DFM modules into IPLib vendors 330 such that the DFM module can be built into an IPLib package for DFM enhanced design functionality. Again, the DFM module is capable of being integrated with DFM data presented in DUF, and/or may include at least portion of DFM data presented in DUF. Thus the DFM compliant design tools and DFM compliant IPLib are integrated for DFM compliant and enhanced IC design for customers 340.

Figure 4:
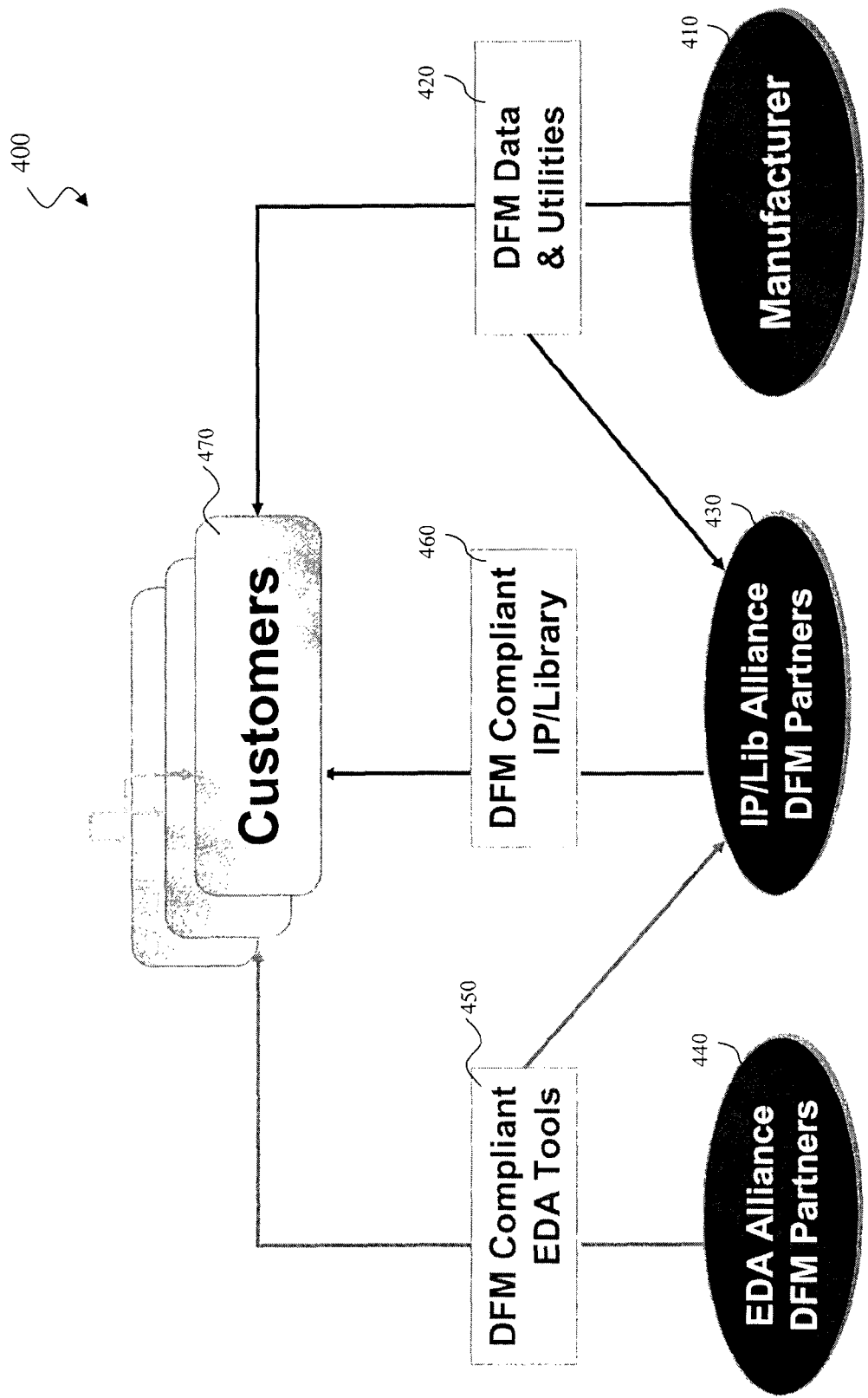
FIG. 4 is a block diagram illustrating an integrated DFM system including its structure and method to implement design for manufacturing among semiconductor manufacturing, design tool vendor partners, Intellectual property library (IPLib) partners, and customers.

Further referring to FIG. 4 as a block diagram, it describes an integrated DFM system 400 including its structure and method to implement design for manufacturing among semiconductor manufacturing, design tool vendor partners, IPLib partners, and customers. A manufacturer 410 such as a foundry provides DFM related information 420 including DFM data and DFM utilities to an IPLib Partner 430. Design tool partners 440 such as EDA tool vendors provide DFM compliant design tools 450 to the IPLib Partner 430. The DFM data and utilities 420 may be combined with the DFM compliant design tool 450 to generate a DFM compliant IPLib 460. The DFM compliant EDA tool 450, IPLib 460, and DFM data & DFM utilities 420 are then provided to customers 470 such as a semiconductor design house or a microelectronic device company for customer product design process that is compliant to manufacturing technologies of the semiconductor manufacturer.

Unified Qualification between Manufacturing and Design Tool Vendors

Figure 5:
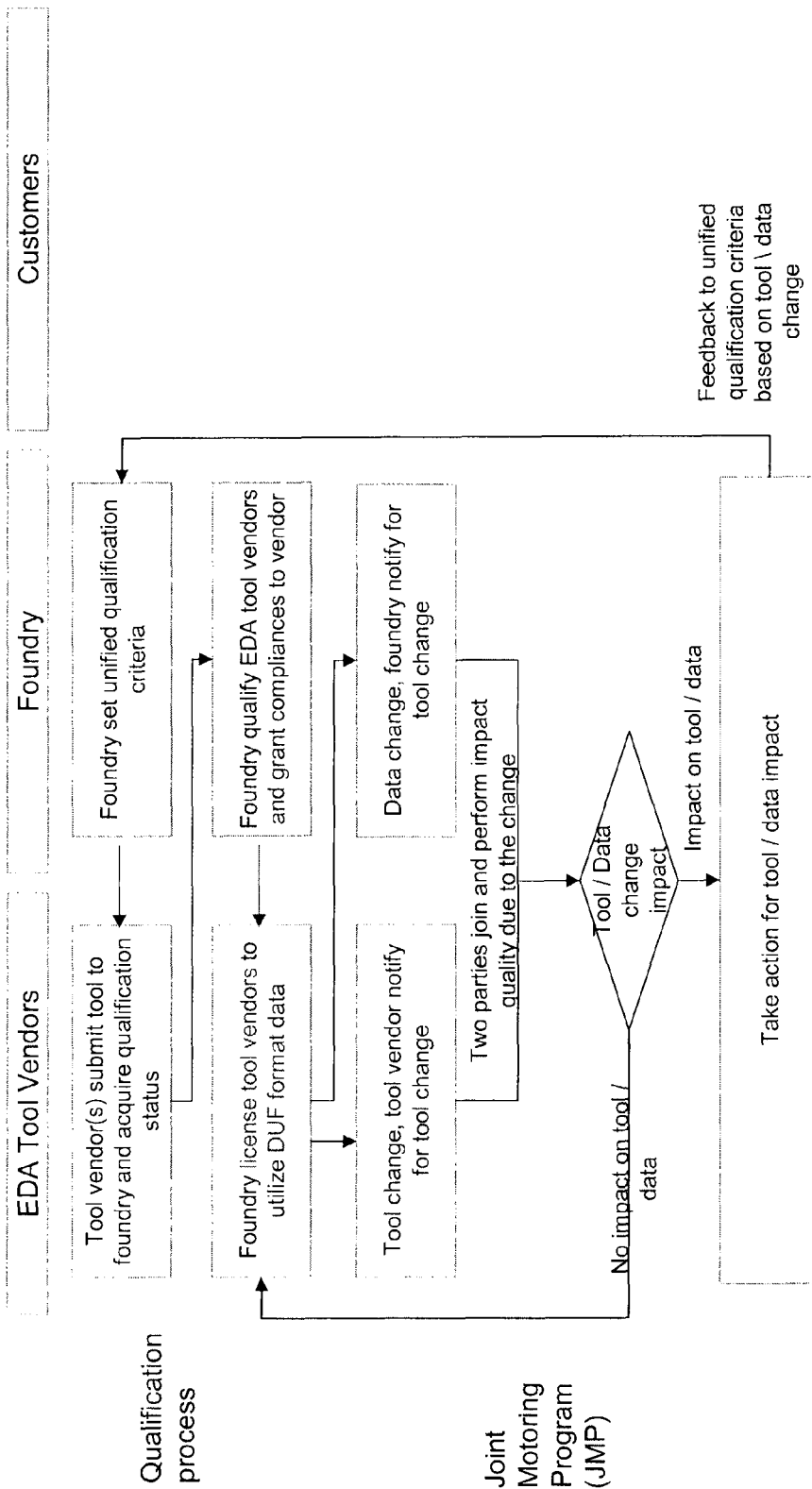
FIG. 5 is a flowchart to implement a joint motoring program (JMP) for centralizing qualification and unifying qualification criteria of design tools utilizing partnership between a manufacturer and a design tool vendor.

FIG. 5 provides a flowchart 500 to implement a joint motoring program (JMP) for centralizing qualification and unifying qualification criteria of design tools utilizing partnership between a manufacturer and a design tool vendor. A manufacturer such as a semiconductor foundry sets up an initial qualification criteria or a qualification criteria with feedback from the interaction between the design tool vendor and the manufacturer including action for design tool and data impact as described in the following method and may provide thereof to the design tool vendor. Then the design tool vendor submits a design tool that is generated with regards to the qualification criteria and submit the design tool for the manufacturer for qualification processing and acquires for qualification status. Thereafter, the manufacturer qualifies the design tool and additionally the design tool vendor, may grant compliances of the design tool to the manufacturer according to the qualification, and licenses the design tool vendor to utilize DFM related information from the manufacturer including the DFM unified format (DUF) data. According to the utilization of the manufacturing data, the manufacturer may change the manufacturing data and notify the design tool vendor for the data changes, while the design tool vendor may also change design tool configuration, database, and other portions and notify the manufacturer for the tool changes. The two parties (the design tool vendor and the manufacturer) may join the efforts on evaluation, impact, and integration with regards to the design tool due to the tool changes and/or the data changes. If the tool and data changes have no additional impact to the design tool and the manufacturing data, the method may return to the previous step to license the design tool vendor for utilizing the manufacturing data as illustrated in the flowchart of FIG. 5. Otherwise, further actions with regards to the tool and data impact may be implemented and therefore the method returns to the previous step for the manufacturer to set or update an unified qualification criteria considering the impact, for the design tool vendor to follow for further tuning the design tool as illustrated in the figure of Sheet 9. The described method may have other variances and may return to a previous step and repeat a subset of the steps according to result of the corresponding step.

Unified qualification between manufacturing and library IPLib

Figure 6:
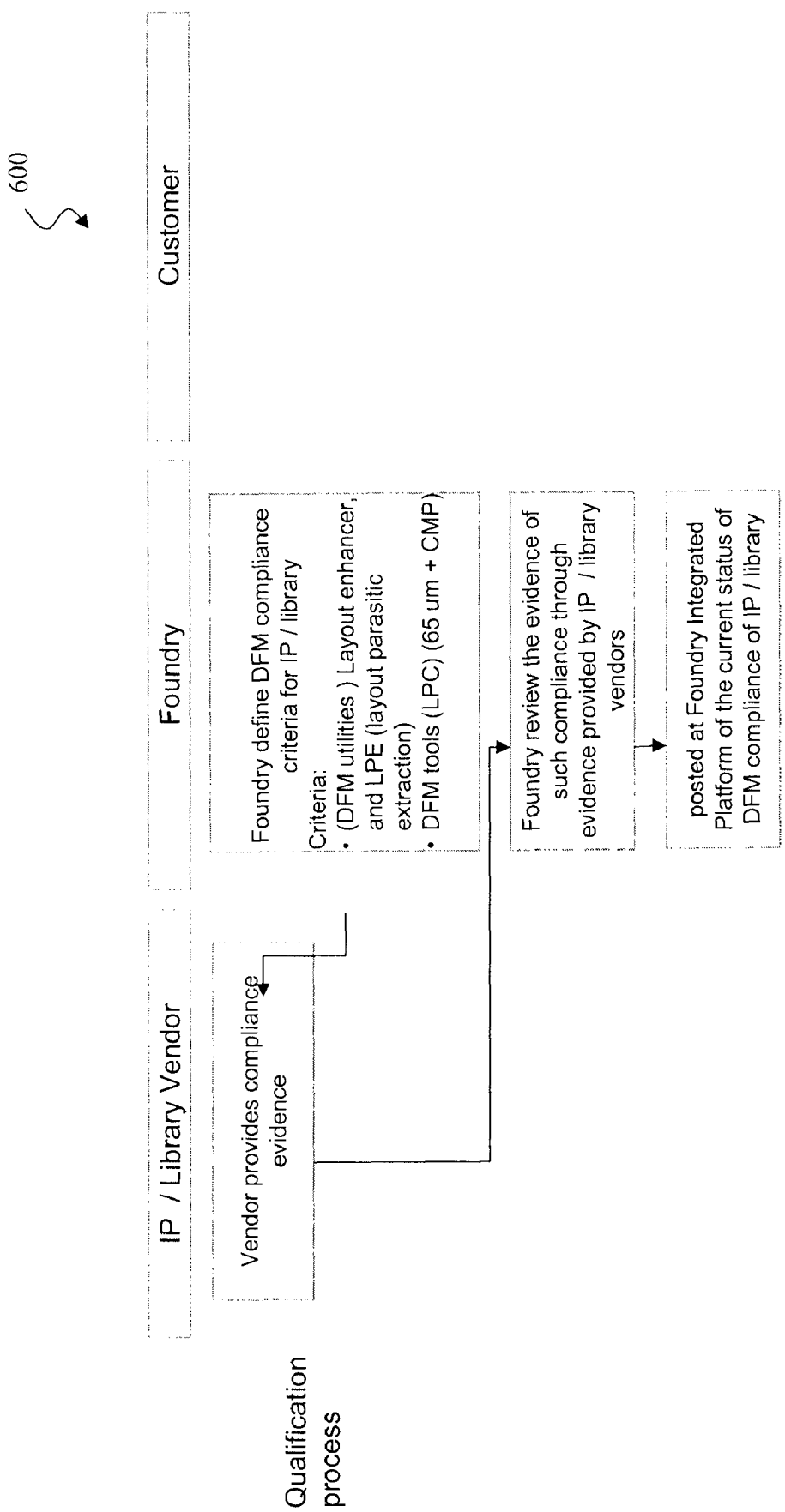
FIG. 6 is a flowchart for centralizing qualification and unifying qualification criteria of design IPLib partnership between a manufacturer and an IPLib partner.

FIG. 6 provides a flowchart 600 for centralizing qualification and unifying qualification criteria of design IPLib partnership between a manufacturer and an IPLib partner. The manufacturer defines a DFM compliance criteria for an IPLib vendor. The compliance criteria may include or relate to (but not limit to) DFM utilities such as layout enhancer, and layout parasitic extraction, and DFM tools such as lithography process control (LPC) and a CMP process for 65 nm technology node. The DFM compliance criteria are provided to the IPLib vendor. After the IPLib effort on IPLib processing, the IPLib vendor provides evidence of compliance of IPLib to the manufacturing to the manufacturer. The manufacturer review the evidence of such compliance and post at a foundry integrated platform of the current status of DFM compliance of IPLib. The disclosed method may also repeat a subset of the steps, have additional steps incorporated, and have other variance for the joint effort on developing DFM compliant IPLib.

Seed License Program of Delivery Stage

Figure 7:
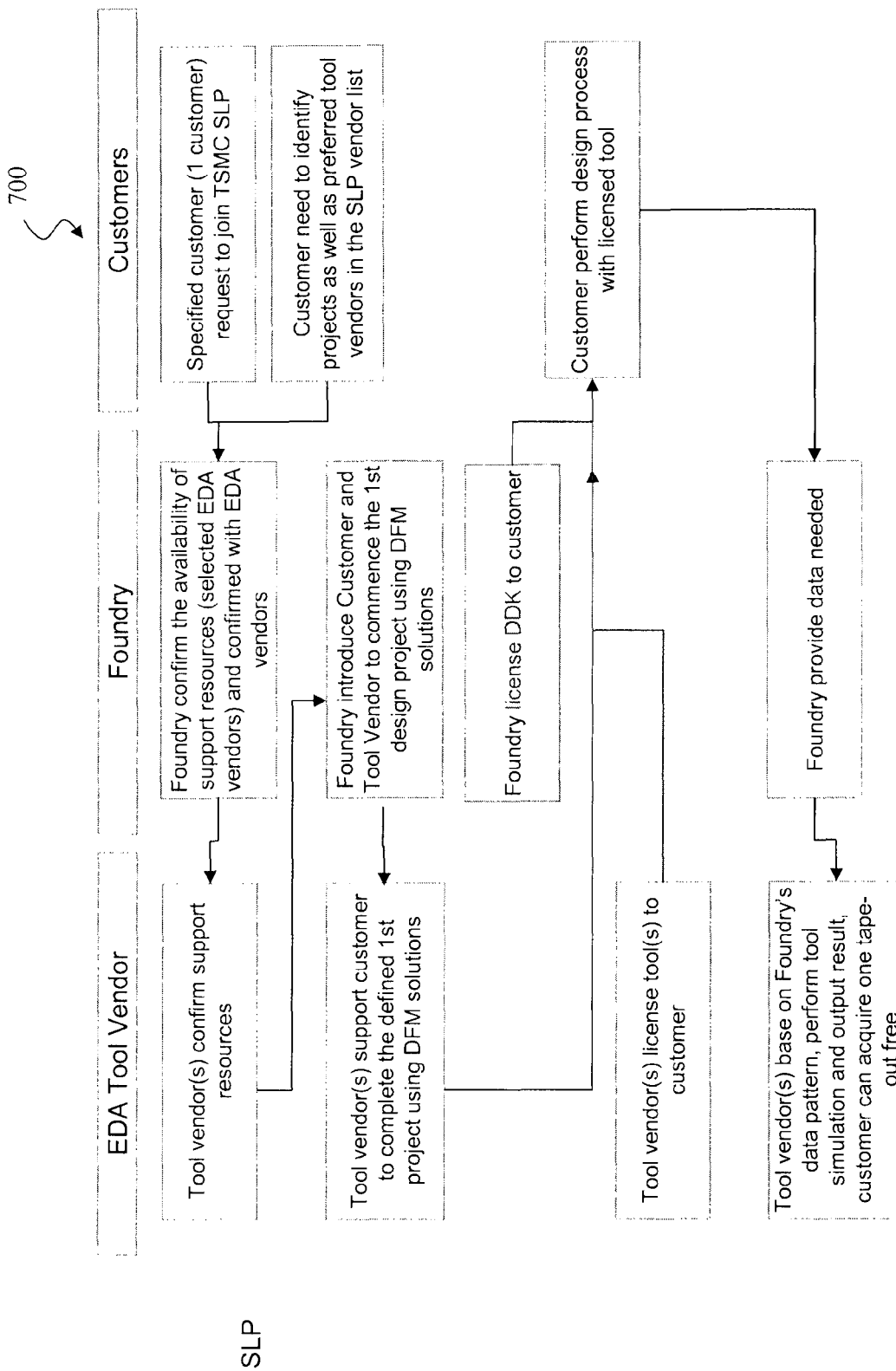
FIG. 7 illustrates a flowchart to implement a seed license program (SLP) of delivery stage during an interaction among a manufacturer, a design tool vendors, and customers.

FIG. 7 illustrates a flowchart 700 to implement a seed license program (SLP) of delivery stage during an interaction among a manufacturer, a design tool vendors, and customers. The method may initiate at a step by one of the customers requesting to join the manufacturer SLP. At this step, the customer may need to identify projects as well as one or more preferred design tool vendor provided in a SLP design tool vendor list. The manufacturer confirms the availability of the corresponding support resources including the selected (or preferred) design tool vendor and further confirms with the selected design tool vendor. The selected design tool vendor then echoes to the manufacturer to confirm the availability. Thereafter, the manufacturer introduce the customer and the selected design tool vendor to commence the first design project (or identified project) utilizing the DFM solutions such as those described above and later in the application. The design tool vendor support the customer to complete the first project utilizing the DFM solutions. With the licensed DDK form the manufacturer, the licensed design tool from the design tool vendor, and additionally support from the design tool vendor, the customer performs a design process to the first design project. The manufacturer further provides manufacturing data necessary along with the design result from the customer to the design tool vendor. The design tool vendor performs tool simulation, output result, and the tape-out to the customer.

Alternatively, the tape-out may be directly generated from the design process by the customer under the incorporation of the design tool vendor and the manufacturer.

DFM Unified Format

Figure 8:
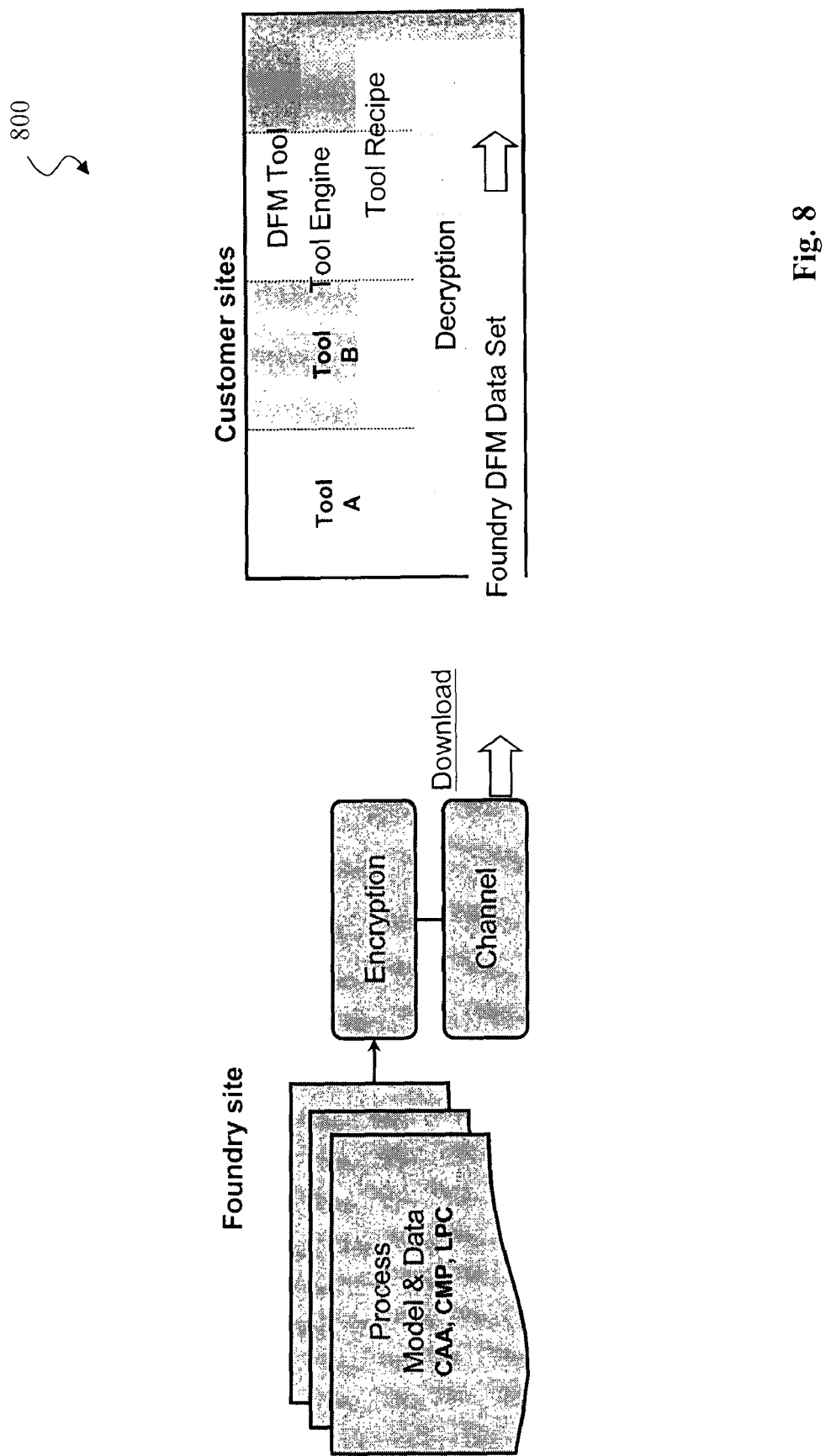
FIG. 8 describes and illustrates DFM unified format (DUF) categories and utilization, in which DUF provides one unified format to present manufacturing data among design tool vendors, manufacturer, and customers for DFM associated integrated circuit (IC) design.

FIG. 8 describes and illustrates DFM unified format (DUF) categories and utilization. DUF provides one unified format to present manufacturing data among design tool vendors, manufacturer, and customers for DFM associated integrated circuit (IC) design. The DUF may include but not limit to at least three categorized data structures: lithography process control, chemical mechanical polishing, and critical area analysis. During DUF data flow among the design tool vendors, manufacturer, and the customers, the manufacturing data are encrypted and provided by the manufacturer to customers in the universal DFM data format (DUF). Furthermore, the unified DFM data may be plugged into a manufacturer certified DFM design tool to validate DFM associated design process.

In summary, the aspects of the present disclosure provide a method and system for improved design for manufacturability. In this way, process yields can be increased, accurately predicted, and/or customer service satisfaction may be improved.

The present disclosure can take the form of an entirely hardware embodiment, an entirely software embodiment, or an embodiment containing both hardware and software elements. In an illustrative embodiment, the disclosure is implemented in software, which includes but is not limited to firmware, resident software, microcode, etc.

Furthermore, embodiments of the present disclosure can take the form of a computer program product accessible from a tangible computer-usable or computer-readable medium providing program code for use by or in connection with a computer or any instruction execution system. For the purposes of this description, a tangible computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, a semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital video disc (DVD).

The present disclosure provides one efficient business model of foundry-supplied design data (design rules, SPICE Models, etc.) for design tape out on new technology. The present disclosure also provides one better solution to incorporate additional manufacturing variance data (LPC, CMP, CAA, Statistical models, etc.) that EDA tool vendor and customer need.

In one embodiment, the present disclosure provides a design for manufacturing system (DFM). The DFM (or DFM system) includes DFM advisories; a DFM data kit; and DFM utilities utilizing the DFM data kit and the DFM advisories for enhancing integrated circuit (IC) designing. The DFM data kit is presented in a DFM unified format in one embodiment.

The disclosed DFM system may be further integrated with a DFM compliant IC design tool. The DFM system may be further integrated with a DFM compliant IC design tool to generate an IC IPLib. The DFM system may further include a mechanism to unify qualification criteria to qualify a DFM compliant IC design tool. The DFM system may further include a mechanism to unify qualification criteria to qualify a DFM compliant IPLib. The DFM system may further include a seed license program (SLP) utilized during a DFM associated IC design process. The SLP may include various mechanisms for interaction among a design tool vendor, a customer, and a customer, including an action selected from the group consisting of confirming, identifying, licensing, providing, performing, simulating, and combinations thereof. The DFM data kit may further include a lithography process control (LPC) module employing lithography processing data from a manufacturer; a chemical mechanical polishing (CMP) module employing CMP processing data from the manufacturer; and a critical area analyzer (CAA) employing defect related manufacturing data from the manufacturer. The DFM advisories may include action required rules integrated with a design tool; recommend rules integrated with the design tool; and guidelines provided to a designer for implementing IC design. The DDK may be encrypted to from an encrypted manufacturing data. The DDK may further include a decryption module embedded in a design tool. The DFM utilities may include a layout parasitic extraction (LPE); a checker; an enhancer; and a dummy insertion module.

In another embodiment, the present disclosure provides an integrated design for manufacturing (DFM) method. The method includes providing DFM data and DFM utilities by a manufacturer; providing a DFM compliant design tool by a design tool vendor; and developing DFM compliant IPLib utilizing the DFM data, DFM utilities, and DFM compliant design tool. The method may further include combining the DFM data and DFM utilities with the DFM compliant design tool before the developing of the IPLib.

The present disclosure also provides another embodiment of a design for manufacturing (DFM) method. The method includes setting up a unified qualification criteria; qualifying a DFM design tool according to the unified qualification criteria; and utilizing a DFM unified format (DUF) data with the DFM design tool. The method may further include changing the DFM design tool; changing DUF data; and evaluating impacts from the changing of the DFM design tool and the changing of the DUF data. The method may further include taking an action according the impacts.

The present disclosure also provides another embodiment of a design for manufacturing (DFM) method. The method includes defining a DFM compliance criteria for IPLib by a manufacturer; providing compliance evidence the manufacturer by an IPLib vendor; and reviewing the evidence by the manufacturer. The method may further include posting current status of IPLib DFM compliance.

The present disclosure also provides another embodiment of a design for manufacturing (DFM) method. The method includes identifying a design tool vendor by a customer; confirming availability of the design tool vendor by a manufacturer and the design tool vendor; providing DFM data by the manufacturer and a design tool by the design tool vendor; and performing a design process utilizing the design tool and the DFM data.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims.

What is claimed is:

1. A computer-implemented design for manufacturing system (DFM), comprising:
   DFM advisories stored on a non-transitory computer-readable medium;
   a DFM data kit stored on a non-transitory computer-readable medium; and
   DFM utilities stored on a non-transitory computer-readable medium and executable on the computer, the DFM utilities utilizing the DFM data kit (DDK) and the DFM advisories for enhancing integrated circuit (IC) designing;
   wherein the data comprising the DFM data kit is presented in a DFM unified format (DUF), the DUF comprising at least one data structure selected from a group consisting of lithography process control data, chemical mechanical polishing data, and critical area analysis data, the DUF further comprising a unified format for presenting IC design and manufacturing data among a design tool vendor, an IC manufacturer, and a customer; and
   wherein the DFM system further comprises a mechanism to unify qualification criteria to qualify a DFM compliant IC design tool.

2. The DFM of claim 1 wherein the DFM is integrated with a DFM compliant IC design tool and wherein the data comprising the DFM data kit is used to validate a DFM-associated design process.

3. The DFM of claim 1 wherein the DFM is integrated with a DFM compliant IC design tool to generate an IC intellectual property library (IPLib).

4. The DFM of claim 1, further comprising a mechanism to unify qualification criteria to qualify a DFM compliant IPLib.

5. The DFM of claim 1, further comprising a seed license program (SLP) utilized during a DFM associated IC design process.

6. The DFM of claim 5, wherein the SLP comprises various mechanisms for interaction among a design tool vendor, a customer, and a customer, including an action selected from the group consisting of confirming, identifying, licensing, providing, performing, simulating, and combinations thereof.

7. The DFM of claim 1, wherein the DFM data kit further comprises:
   a lithography process control (LPC) module employing lithography processing data from a manufacturer;
   a chemical mechanical polishing (CMP) module employing CMP processing data from the manufacturer; and
   a critical area analyzer (CAA) employing defect related manufacturing data from the manufacturer.

8. The DFM of claim 1, wherein the DFM advisories comprise:
   action required rules integrated with a design tool;
   recommend rules integrated with the design tool; and
   guidelines provided to a designer for implementing IC design.

9. The DFM of claim 1, wherein the DDK is encrypted to from an encrypted manufacturing data.

10. The DFM of claim 9, wherein the DDK further includes a decryption module embedded in a design tool.

11. The DFM of claim 1, wherein the DFM utilities comprise:
    a layout parasitic extraction (LPE);
    a checker;
    an enhancer; and
    a dummy insertion module.

12. An integrated design for manufacturing (DFM) method comprising computer-implemented steps of:
- storing on at least one non-transitory computer-readable storage medium DFM data, a DFM data kit, and DFM utilities of a manufacturer, wherein the data comprising the DFM data kit is presented in a DFM unified format (DUF), the DUF comprising at least one data structure selected from a group consisting of lithography process control data, chemical mechanical polishing data, and critical area analysis data, the DUF further comprising a unified format for presenting IC design and manufacturing data among a design tool vendor, an IC manufacturer, and a customer;
- applying unified qualification criteria to qualify an IC design tool as a DFM compliant IC design tool;
- providing the DFM compliant design tool by a design tool vendor, the DFM compliant design tool comprising instructions executable on a computer; and
- developing a DFM compliant intellectual property library (IPLib) utilizing the DFM data, DFM utilities, and DFM compliant design tool, wherein the developing comprises the DFM compliant design tool executing on the computer accessing the DFM data and DFM utilities.

13. The method of claim 12 further comprising a computer-implemented step of combining the DFM data and DFM utilities with the DFM compliant design tool before the developing of the IPLib.

14. A computer program product for implementing a design for manufacturing (DFM) method, the computer program product comprising a non-transitory computer-readable medium having stored thereon instructions executable by a computer for causing the computer to:
- set up a unified qualification criteria;
- qualify a DFM design tool according to the unified qualification criteria; and
- utilize a DFM unified format (DUF) data with the DFM design tool, wherein the DUF data comprises at least one data structure selected from a group consisting of lithography process control data, chemical mechanical polishing data, and critical area analysis data; the DUF data further comprising a unified format for presenting IC design and manufacturing data among a design tool vendor, an IC manufacturer, and a customer.

15. The computer program product of claim 14 wherein the non-transitory computer-readable medium further has stored thereon instructions executable by the computer for causing the computer to:
- change the DFM design tool;
- change DUF data; and
- evaluate impacts responsive to a changing of the DFM design tool and the changing of the DUF data.

16. The computer program product of claim 15 wherein the non-transitory computer-readable medium further has stored thereon instructions executable by the computer for causing the computer to take an action according to the impacts.

17. The method of claim 12, wherein the DFM data kit further comprises:
- a lithography process control (LPC) module employing lithography processing data from a manufacturer;
- a chemical mechanical polishing (CMP) module employing CMP processing data from the manufacturer; and
- a critical area analyzer (CAA) employing defect related manufacturing data from the manufacturer.

18. The computer program product of claim 14, further comprising:
- encrypting the DUF data; and
- presenting the encrypted DUF data to at least on of the design tool vendor, the IC manufacturer, and the customer.

* * * * *